United States Patent [19]

Blaylock

[11] 4,181,207
[45] Jan. 1, 1980

[54] CLUTCH THROW-OUT BEARING PLATE

[76] Inventor: Tommy J. Blaylock, 2448 NW. 3, Oklahoma City, Okla. 73107

[21] Appl. No.: 925,066

[22] Filed: Jul. 17, 1978

Related U.S. Application Data

[63] Continuation-in-part of Ser. No. 799,448, May 23, 1977, Pat. No. 4,114,744.

[51] Int. Cl.² ............................................. F16D 23/14
[52] U.S. Cl. ................................... 192/98; 192/70.26
[58] Field of Search ..................... 192/98, 99 A, 89 B, 192/111 A, 111 R, 70.25, 70.26, 70.29, 70.3

[56] References Cited

U.S. PATENT DOCUMENTS

| | | | |
|---|---|---|---|
| 1,546,674 | 7/1925 | Reese | 192/70.29 X |
| 1,886,294 | 11/1932 | Morris | 192/99 A X |
| 2,765,060 | 10/1956 | Stenger | 192/70.29 |
| 3,211,265 | 10/1965 | Crutchley | 192/99 A |
| 3,392,812 | 7/1968 | Kaptur et al. | 192/70.29 X |

Primary Examiner—Benjamin Wyche
Attorney, Agent, or Firm—Robert K. Rhea

[57] ABSTRACT

In a vehicle clutch construction, a flat plate ring is interposed between the clutch throw-out bearing and clutch release fingers and maintained concentric with the throw-out bearing by a flexible connection with the clutch release fingers.

2 Claims, 7 Drawing Figures

CLUTCH THROW-OUT BEARING PLATE

CROSS REFERENCE TO RELATED APPLICATION

This application is a continuation-in-part of an application filed by me in the United States Patent and Trademark Office on May 23, 1977, Ser. No. 799,448, now U.S. Pat. No. 4,114,744 and entitled CLUTCH THROW-OUT BEARING PLATE.

BACKGROUND OF THE INVENTION

1. Field of the Invention

The present invention relates to vehicle clutches and more particularly to a pressure plate to be installed between the throw-out bearing and clutch release fingers.

In a vehicle clutch construction, a clutch throw-out bearing surrounds the transmission input shaft and is moved axially along this shaft by the clutch pedal for engaging the clutch release fingers to separate the clutch pressure plate from the stationary clutch disk secured to the adjacent face of the flywheel thus disengaging the clutch for shifting transmission gears. Contact between the throw-out bearing and the clutch release fingers results in a three-point frictional wearing-out action of the throw-out bearing necessitating its replacement. This is time consuming and relatively expensive repair in that the gear train, including the transmission of the vehicle, must be disconnected from the clutch in order to remove the old throw-out bearing and install a new one.

2. Description of the Prior Art.

Prior patents, such as U.S. Pat. Nos. 3,333,664 and 3,486,598 generally relate to construction of the throw-out bearing rather than a friction or pressure plate to be interposed between the throw-out bearing and the clutch release fingers for minimizing wear of the throw-out bearing.

U.S. Pat. No. 1,886,294 discloses a clutch throw-out bearing connecting collar which includes clutch release levers pivotally pinned, at one end, thereto with the opposite end of the levers being mounted between clutch plates for rocking movement in both axial and lateral directions.

U.S. Pat. No. 3,211,265 discloses a lever release plate connected with clutch release fingers by bolts inserted through the inwardly disposed ends of clutch release levers and slidable in radial slots formed in the lever release plate.

This invention is distinctive over these patents and my co-pending application by providing a throw-out bearing pressure plate having attached connectors to be interposed between the clutch release levers and a throw-out bearing on substantially any conventional vehicle friction clutch without the necessity of replacing or modifying the clutch release levers.

SUMMARY OF THE INVENTION

A flat ring bearing plate is interposed between one face of the clutch release fingers of a vehicle clutch concentric with the transmission input shaft. Connectors, secured to the ring bearing plate, flexibly connect the ring bearing plate to the clutch release fingers for movement of the clutch release fingers in a radial direction relative to the ring plate as the clutch is engaged and released.

The principal object of this invention is to provide a friction bearing plate to be interposed between the clutch throw-out bearing and clutch release fingers to minimize wear on the clutch throw-out bearing and increase its useful life.

DESCRIPTION OF THE PREFERRED EMBODIMENTS

Figure 1:
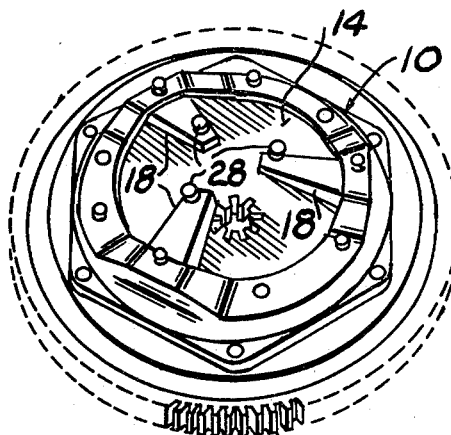
FIG. 1 is a perspective view of a vehicle clutch connected with a flywheel illustrating the relative position of the clutch release fingers which frictionally engage one face of a clutch throw-out bearing.

Like characters of reference designate like parts in those figures of the drawings in which they occur.

In the drawings:

Referring more particularly to FIGS. 1 to 4, the reference numeral 10 indicates a conventional vehicle clutch secured to one face of a flywheel 12. The clutch 10 includes a pressure plate 14 normally urged into frictional engagement with a clutch disk by a plurality of springs, neither being shown, contained by the clutch. The clutch pressure plate 14 is axially moved away from the clutch disk to release the clutch by three clutch release levers or fingers 18 having their free end portions normally spring biased axially away from the clutch toward a clutch throw-out bearing 20 supported by a throw-out bearing support 22. The clutch throw-out bearing 20 and its support 22 coaxially surrounds a transmission input shaft 24 extending between the vehicle transmission T and the clutch 10 with its splined forward end portion 26 cooperatively surrounded by the clutch pressure plate 14. The free end portion of the three clutch release fingers 18 are usually provided with a like plurality of stud bolts 28, or the like, for frictional contact with the adjacent face of the throw-out bearing 20 when a clutch pedal operated lever 30 moves the throw-out bearing 20 toward the clutch. Frictional contact of the clutch throw-out bearing, with the clutch release finger supported stud bolts 28 rotating with the clutch, results in undue wear on the adjacent face of the clutch throw-out bearing.

The above description is conventional with several truck vehicle clutches and throw-out bearings and is set forth to show the structure with which the present invention is intended to be used.

In carrying out the invention a ring-like flat plate 35, having a diameter substantially equal to the diameter of the clutch throw-out bearing 20 and a bore 36 diametrically greater than the diameter of the transmission input shaft 24, is provided with a plurality of connectors 38, three in the example shown, disposed in circumferential equally spaced relation, for securing the plate 35 to the clutch release fingers 18. The connectors 38 each include a stud bolt 40 having a head 42 fastened to the plate by bolt attaching means 43. The bolt attaching means 43 comprises a cylindrical housing 44, loosely surrounding the stud bolt head 42 and a portion of its shank, and secured, as by welding one end to one face of the plate 35 and having its other end portion rolled inwardly, as at 46, toward the shank of the stud bolt. The attaching means 43 further includes a section of resilient material, such as rubber 48, which fills the housing 44 and maintains the stud bolt coaxial with the housing and the stud bolt head in spaced-apart relation with respect to the adjacent surface of the plate 35. The rubber section 48 preferably includes a relatively short cylindrical neck portion 50 projecting out of the housing rolled in end 46 and surrounding an intermediate portion of the stud bolt shank.

The throw-out bearing plate 35 is interposed between the throw-out bearing 20 and clutch release fingers 18 after disconnecting the transmission input shaft from the clutch disk 14. The conventional clutch finger studs 28 are removed and the connector stud bolts 40 are threadedly engaged with the respective clutch release finger including one or more lock nuts 52 for maintaining the position of the connectors 38 with respect to the clutch fingers 18.

The rubber neck portion 50 forms a resilient contact between the respective connectors 38 and clutch fingers 18 and the rubber section 48, within the housing 44, forms a resilient connection between the respective stud bolt and its surrounding housing which permits a pivoting action in a radial direction of the stud bolts with respect to the plate 35 as the clutch fingers move toward and away from the throw-out bearing when releasing and engaging the clutch.

Figure 2:
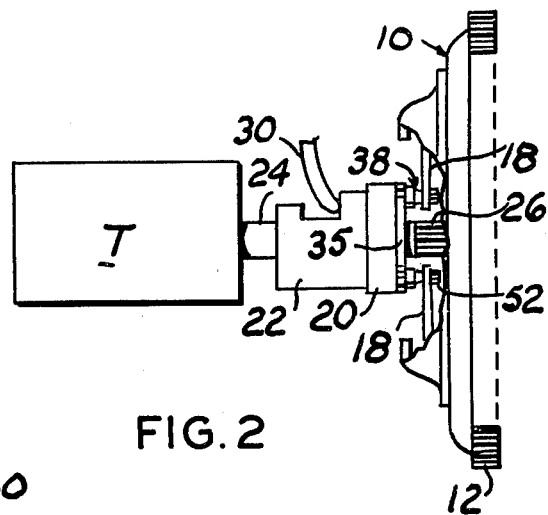
FIG. 2 is a side elevational view of a vehicle clutch connected with a transmission through an input shaft having a throw-out bearing thereon with parts broken away for clarity and illustrating the clutch throw-out bearing pressure plate in clutch released position.
Figure 3:
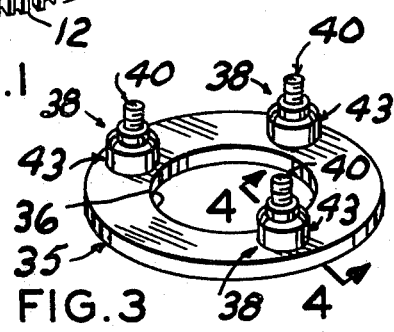
FIG. 3 is a perspective view of the preferred embodiment of the throw-out bearing pressure plate.
Figure 4:
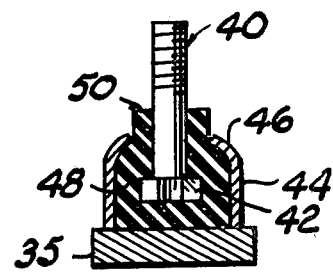
FIG. 4 is a vertical cross sectional view, to a larger scale, taken substantially along the line 4—4 of FIG. 3.

Thus, as shown by FIG. 2, when the clutch throw-out bearing 20 is moved toward the clutch the face of the throw-out bearing plate 35, opposite its connectors, flatly engages the adjacent face of the clutch throw-out bearing 20 with such area of engagement being equal to the face area of the clutch throw-out bearing plate 35 thus evenly distributing clutch release pressure on the face of the throw-out bearing facing the clutch 10.

Figure 6:
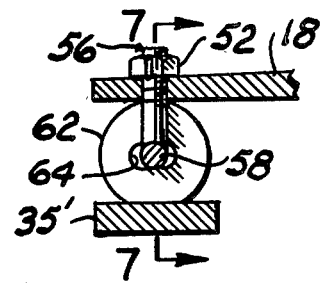
Figure 5:
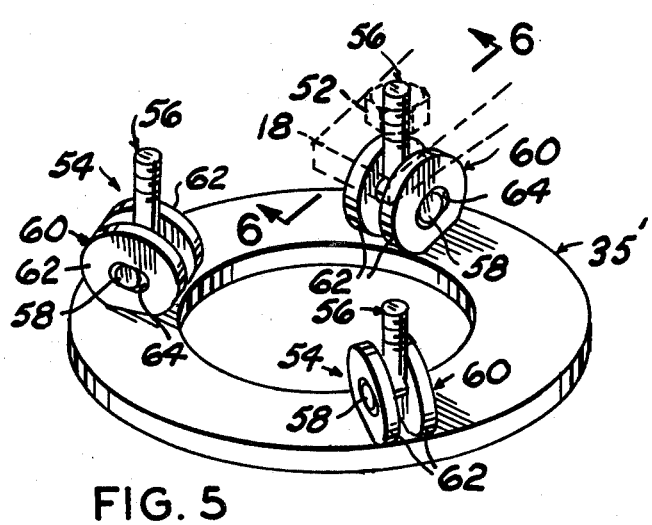
FIG. 5 is a perspective view, on an enlarged scale, illustrating another embodiment of the clutch throw-out bearing pressure plate; and, FIGS. 6 and 7 are vertical cross sectional views, on a further enlarged scale, taken substantially along the lines 6—6 and 7—7 of FIGS. 5 and 6, respectively.
Figure 7:
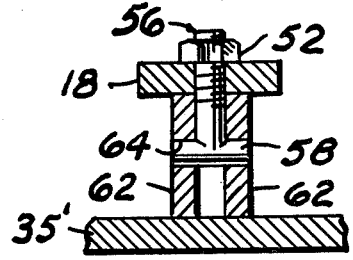

Referring now to FIGS. 5, 6 and 7, another embodiment 35' of the clutch throw-out bearing plate includes three equally spaced apertured disk-like connectors 54 secured to the plate 35'.

The connectors 54 each include a T-shaped stud bolt 56 having its bolt head forming cross bar 58 secured to the plate 35' by bolt attaching means 60. The bolt attaching means 60 comprises a pair of centrally apertured disks 62 arranged in close spaced parallel edgewise relation and secured, as by welding a portion of the periphery of each disk, to one face of the plate 35' with their common axis perpendicular to a radius of the throw-out bearing pressure plate 35' taken between the respective pair of disks 62. The head or cross bar 58 of the T-shaped bolt is inserted into the aperture 64 of the respective disk of each pair of disks 62 prior to welding it to the plate 35'. The spacing between the disks 62 is such that the bolt shank may freely pivot between the disks about the axis of the cross bar 58. The threaded shank of each of the bolts 56 is inserted through the aperture in the end portion of each of the respective fingers 18 and secured by the nuts 52, in the manner described hereinabove, when the plate 35' is interposed between the fingers 18 and clutch bearing 20. The aperture 64, in the respective disk 62, is elongated in the direction of the axis of the respective clutch finger 18 to compensate for the pivoting movement of the fingers 18 during application and release of the clutch.

Obviously the invention is susceptible to changes or alterations without defeating its practicability. Therefore, I do not wish to be confined to the preferred embodiment shown in the drawings and described herein.

I claim:

1. In a vehicle clutch assembly having a flywheel and a clutch pressure plate movable toward and away from the flywheel by a plurality of radially inwardly projecting clutch release fingers, a transmission input shaft connecting the clutch pressure plate with a transmission and having a clutch throw-out bearing coaxially mounted on the shaft and movable toward and away from the inwardly directed end portions of said clutch release fingers, the improvement comprising:

a bearing plate comprising a flat ring-like plate coaxially surrounding said transmission input shaft and interposed between said throw-out bearing and the inwardly directed end portions of said clutch release fingers; and, a plurality of connector means connecting said bearing plate with said fingers permitting limited movement of said clutch release fingers in a radial direction with respect to said bearing plate when said throw-out bearing plate and said clutch release fingers are moved toward and away from said clutch pressure plate, each said connector means comprising a stud bolt having its shank threadedly engaged with the respective said finger and having a head portion projecting toward said bearing plate; and, bolt attaching means pivotally connecting said bolt head portion with said bearing plate, said bolt attaching means comprising a tubular housing loosely surrounding said bolt head portion and secured at one end with one face of said bearing plate and having its other end portion turned inwardly toward the bolt shank, and, resilient material surrounding said bolt head end portion within said housing and having a neck portion projecting outwardly of said other end portion of said housing toward said clutch release finger.

2. In a vehicle clutch assembly having a flywheel and a clutch pressure plate movable toward and away from the flywheel by a plurality of radially inwardly projecting clutch release fingers, a transmission input shaft connecting the clutch pressure plate with a transmission and having a clutch throw-out bearing coaxially mounted on the shaft and movable toward and away from the inwardly directed end portions of said clutch release fingers, the improvement comprising:

a bearing plate comprising a flat ring-like plate coaxially surrounding said transmission input shaft and interposed between said throw-out bearing and the inwardly directed end portions of said clutch release fingers; and, a plurality of connector means connecting said bearing plate with said fingers permitting limited movement of said clutch release fingers in a radial direction with respect to said bearing plate when said throw-out bearing plate and said clutch release fingers are moved toward and away from said clutch pressure plate, each said connector means comprising a stud bolt having its shank threadedly engaged with the respective said finger and having a T-shaped head end portion projecting toward said bearing plate, and, bolt attaching means pivotally connecting said bolt head end portion with said bearing plate, said bolt attaching means comprising a pair of centrally apertured disks secured in parallel spaced-apart edge-wise relation to one face of said bearing plate and journalling said bolt T-shaped head end portion therebetween.

* * * * *